US011275466B2

(12) United States Patent
Kang et al.

(10) Patent No.: US 11,275,466 B2
(45) Date of Patent: Mar. 15, 2022

(54) MOBILE TERMINAL HAVING A TOUCH SCREEN AND METHOD FOR PROVIDING A USER INTERFACE THEREIN

(71) Applicant: Samsung Electronics Co., Ltd., Gyeonggi-do (KR)

(72) Inventors: Ji Young Kang, Gyeonggi-do (KR); Kyung Hwa Kim, Seoul (KR); Dong Jun Shin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 17/073,499

(22) Filed: Oct. 19, 2020

(65) Prior Publication Data

US 2021/0034190 A1 Feb. 4, 2021

Related U.S. Application Data

(63) Continuation of application No. 15/444,488, filed on Feb. 28, 2017, now Pat. No. 10,809,844, which is a (Continued)

(30) Foreign Application Priority Data

Aug. 30, 2011 (KR) .................. 10-2011-0087060

(51) Int. Cl.
*G06F 3/041* (2006.01)
*G06F 3/0488* (2013.01)
(Continued)

(52) U.S. Cl.
CPC ........ *G06F 3/0416* (2013.01); *G06F 3/04883* (2013.01); *H04M 1/0266* (2013.01); *H04M 1/724* (2021.01); *H04M 2250/22* (2013.01)

(58) Field of Classification Search
None
See application file for complete search history.

(56) References Cited

U.S. PATENT DOCUMENTS 5,463,725 A 10/1995 Henckel et al.
7,231,231 B2 6/2007 Kokko et al.
(Continued)

FOREIGN PATENT DOCUMENTS

CN 101539833 A 9/2009
CN 101615409 A 12/2009
(Continued)

OTHER PUBLICATIONS

Zoomsafer, "How Teen Safer Works"; Sep. 20, 2010; https://www.youtube.com/watch?time_continue=46&v=Jq-oXLWMOFo.
(Continued)

*Primary Examiner* — Chad M Dicke
(74) *Attorney, Agent, or Firm* — Cha & Reiter, LLC (57) ABSTRACT

A mobile terminal having a touch screen and a method present a user interface in the mobile terminal having a touch screen. The method includes: detecting a touched area corresponding to a touch when the touch is sensed in the touch screen; and executing different functions according to whether the detected touched area is equal to or greater than a preset area threshold. Various touch inputs are sensed through a touch screen in the mobile terminal, and the mobile terminal and method present user interfaces corresponding to the respective touch inputs.

6 Claims, 10 Drawing Sheets

Related U.S. Application Data continuation of application No. 14/833,830, filed on Aug. 24, 2015, now abandoned, which is a continuation of application No. 13/546,643, filed on Jul. 11, 2012, now Pat. No. 9,134,902.

(51) Int. Cl.
*H04M 1/724* (2021.01)
*G06F 3/04883* (2022.01)
*H04M 1/02* (2006.01)

(56) References Cited

U.S. PATENT DOCUMENTS

| | | |
|---|---|---|
| 8,004,498 B1 | 8/2011 | Meridian |
| 8,255,830 B2 | 8/2012 | Ording et al. |
| 8,347,232 B1 | 1/2013 | Prud' Hommeaux et al. |
| 8,384,744 B2 | 2/2013 | Nashida et al. |
| 8,421,483 B2 | 4/2013 | Klinghult et al. |
| 8,487,888 B2 | 7/2013 | Wigdor et al. |
| 8,539,383 B2 | 9/2013 | Zotov et al. |
| 8,581,877 B2 | 11/2013 | Yoo |
| 8,854,523 B2 | 10/2014 | Fukuda |
| 8,924,894 B1 | 12/2014 | Yaksick et al. |
| 9,507,511 B2 | 11/2016 | Ikeda |
| 10,007,393 B2 | 6/2018 | King et al. |
| 10,031,586 B2 | 7/2018 | Touloumtzis |
| 10,346,027 B2 | 7/2019 | Miyazaki |
| 2006/0012580 A1 | 1/2006 | Perski et al. |
| 2006/0075250 A1 | 4/2006 | Liao |
| 2006/0206815 A1 | 9/2006 | Pathiyal et al. |
| 2006/0227115 A1 | 10/2006 | Fry |
| 2006/0242607 A1 | 10/2006 | Hudson |
| 2007/0254696 A1 | 11/2007 | Kajitani |
| 2008/0042978 A1* | 2/2008 | Perez-Noguera ..... G06F 3/0445 345/168 |
| 2008/0055263 A1 | 3/2008 | Lemay et al. |
| 2008/0084400 A1* | 4/2008 | Rosenberg ........... H04N 21/422 345/173 |
| 2008/0178126 A1 | 7/2008 | Beeck et al. |
| 2008/0202823 A1 | 8/2008 | Won et al. |
| 2008/0303786 A1 | 12/2008 | Nakamura et al. |
| 2008/0320419 A1 | 12/2008 | Matas et al. |
| 2009/0077504 A1 | 3/2009 | Bell et al. |
| 2009/0160802 A1 | 6/2009 | Yasumi |
| 2009/0187676 A1 | 7/2009 | Griffin et al. |
| 2009/0195515 A1 | 8/2009 | Lee |
| 2009/0237371 A1 | 9/2009 | Kim et al. |
| 2009/0309616 A1 | 12/2009 | Klinghult et al. |
| 2010/0020026 A1* | 1/2010 | Benko ................ G06F 3/04883 345/173 |
| 2010/0026649 A1 | 2/2010 | Shimizu et al. |
| 2010/0031202 A1 | 2/2010 | Morris et al. |
| 2010/0090971 A1 | 4/2010 | Choi et al. |
| 2010/0149090 A1 | 6/2010 | Morris et al. |
| 2010/0149099 A1 | 6/2010 | Elias |
| 2010/0238123 A1 | 9/2010 | Ozias et al. |
| 2010/0245274 A1* | 9/2010 | Fukuda ............... G06F 3/04886 345/173 |
| 2010/0265185 A1 | 10/2010 | Oksanen |
| 2011/0001694 A1 | 1/2011 | Homma et al. |
| 2011/0043434 A1 | 2/2011 | Roncalez et al. |
| 2011/0055773 A1 | 3/2011 | Agarawala et al. |
| 2011/0057886 A1 | 3/2011 | Ng et al. |
| 2011/0082627 A1 | 4/2011 | Small et al. |
| 2011/0084934 A1 | 4/2011 | Tsuzaki et al. |
| 2011/0102369 A1 | 5/2011 | Thorn |
| 2011/0134047 A1 | 6/2011 | Wigdor et al. |
| 2011/0134061 A1 | 6/2011 | Lim |
| 2011/0157078 A1 | 6/2011 | Miyazawa et al. |
| 2011/0256848 A1 | 10/2011 | Bok et al. |
| 2011/0265002 A1 | 10/2011 | Hong et al. |
| 2011/0291944 A1 | 12/2011 | Simmons et al. |
| 2012/0084728 A1 | 4/2012 | Huang et al. |
| 2012/0165076 A1 | 6/2012 | Yu et al. |
| 2012/0182296 A1 | 7/2012 | Han |
| 2012/0212421 A1 | 8/2012 | Honji |
| 2012/0212650 A1 | 8/2012 | Fukuda |
| 2012/0299860 A1 | 11/2012 | Wang et al. |
| 2013/0035141 A1* | 2/2013 | Murakami ............ G06F 3/0488 455/566 |
| 2013/0053107 A1 | 2/2013 | Kang et al. |
| 2013/0179810 A1 | 7/2013 | Lim |
| 2013/0321337 A1 | 12/2013 | Graham et al. |
| 2015/0138072 A1 | 5/2015 | Yamazaki et al. |
| 2016/0041715 A1 | 2/2016 | Sirpal et al. |

FOREIGN PATENT DOCUMENTS

| | | |
|---|---|---|
| CN | 101866259 A | 10/2010 |
| CN | 101943990 A | 1/2011 |
| CN | 102109926 A | 6/2011 |
| JP | 2002-373057 A | 12/2002 |
| JP | 2003-140820 A | 5/2003 |
| JP | 2006-527439 A | 11/2006 |
| JP | 2010-39558 A | 2/2010 |
| JP | 2010-118042 A | 5/2010 |
| JP | 2010-176575 A | 8/2010 |
| JP | 2010-244132 A | 10/2010 |
| JP | 2010-277183 A | 12/2010 |
| JP | 2010-277198 A | 12/2010 |
| JP | 2011-048666 A | 3/2011 |
| JP | 2011-048848 A | 3/2011 |
| JP | 2011-101184 A | 5/2011 |
| JP | 2011-108276 A | 6/2011 |
| JP | 2011-134271 A | 7/2011 |
| JP | 2013-50952 A | 3/2013 |
| JP | 2015-118701 A | 6/2015 |
| KR | 10-1556147 B1 | 9/2015 |
| KR | 10-1962445 B1 | 3/2019 |
| KR | 10-2133272 B1 | 7/2020 |
| TW | 201003496 A1 | 1/2010 |
| WO | 2009/109585 A1 | 9/2009 |
| WO | 2011/094936 A1 | 8/2011 |

OTHER PUBLICATIONS

Adam Dachis;"How to Listen to Just the Audio from a Video Podcast on Your iPhone" http://lifehacker.com/how-to-listen-to-just-the-audio-from-a-video-podcast-on-5817793; Jul. 2011.
Japanese Search Report dated Mar. 2, 2021.
European Search Report dated Apr. 20, 2021.

* cited by examiner

MOBILE TERMINAL HAVING A TOUCH SCREEN AND METHOD FOR PROVIDING A USER INTERFACE THEREIN

CROSS REFERENCE TO RELATED APPLICATIONS

This application is a Continuation of Ser. No. 15/444,488 filed on Feb. 28, 2017 which is a Continuation of U.S. patent application Ser. No. 14/833,830 filed on Aug. 24, 2015 which claims the benefit of the earlier U.S. patent application Ser. No. 13/546,643 filed on Jul. 11, 2012 and assigned U.S. Pat. No. 9,134,902 issued on Sep. 15, 2015 which claims, pursuant to 35 USC 119(a), priority to, and the benefit of the earlier filing date of, a Korean patent application filed on Aug. 30, 2011 in the Korean Intellectual Property Office and assigned Serial Number 10-2011-0087060, the contents of which are herein incorporated by reference.

BACKGROUND

1. Field of the Invention

The present invention relates to a mobile terminal and a method for operating the same, and more particularly, to a mobile terminal and a method for providing a user interface therein.

2. Description of the Related Art

In general, a mobile terminal may perform a complicated function and complex operations as various functions are added thereto. In this case, the mobile terminal includes or is connected to peripherals including an input unit such as a keyboard or a mouse for executing various functions. However, it is not convenient to carry the mobile terminal with such peripherals. Accordingly, to solve the problem, mobile terminals in the prior art includes a touch panel instead of the peripherals such as a keyboard or a mouse. The touch panel is configured to have a plurality of touch sensors. That is, the mobile terminal provides a User Interface (UI), and executes a certain function corresponding to a touch input. There is a limitation in providing user interfaces corresponding to various touch inputs in the mobile terminals of the prior art.

SUMMARY

To solve the above-mentioned problems, the present invention provides user interfaces corresponding to various touch inputs. That is, the present invention provides user interfaces corresponding to the respective touch inputs.

In accordance with an aspect of the present invention, a method for providing a user interface in a mobile terminal having a touch screen includes: detecting a touched area corresponding to a touch when the touch is sensed in the touch screen; and executing different functions according to whether the detected touched area is equal to or greater than a preset area threshold.

Executing different functions includes executing the different functions according to a movement of the touch, a moving distance and a moving direction of the touch when the touch moves, or a holding time of the touch when the touch does not move.

In accordance with another aspect of the present invention, a mobile terminal for providing user interfaces includes: a touch screen for sensing a touch; an area detector for detecting a touched area corresponding to the touch; and a controller for executing different functions according to whether the touched area is equal to or greater than a preset area threshold.

The controller executes the different functions according to a movement of the touch, a moving distance and a moving direction of the touch when the touch moves, a holding time of the touch when the touch does not move.

In a mobile terminal having a touch screen and a method for providing user interfaces therein according to the present invention, various touch inputs are sensed through a touch screen in the mobile terminal, and user interfaces corresponding to the respective touch inputs are provided. That is, the mobile terminal determines a touch input based on at least one of a touched area, a movement of a touch, a moving distance, a moving direction, or a holding time of a touch sensed through a touch screen. In addition, the mobile terminal provides user interfaces for executing functions corresponding to the respective touch inputs. Such user interfaces and detection and processing of the touches improve convenience in using the mobile terminal.

BRIEF DESCRIPTION OF THE DRAWINGS

The above features and advantages of the present invention will be more apparent from the following detailed description in conjunction with the accompanying drawings, in which.

DETAILED DESCRIPTION

Preferred embodiments of the present invention are described with reference to the accompanying drawings in detail. This invention may, however, be embodied in many different forms and should not be construed as limited to the exemplary embodiments set forth herein. The same reference numbers are used throughout the drawings to refer to the same or like parts. Detailed descriptions of well-known functions and structures incorporated herein may be omitted to avoid obscuring the subject matter of the present invention. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylus, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among terms set forth herein, data refers to any kind of information processed by the device, including text and/or images received from any external entities, messages transmitted or received, and information created when a specific function is executed by the device.

As used herein, the term "touch" means the act of contacting or approaching a touch screen in a mobile terminal. In this case, the touch may occur by a finger of a mobile terminal user or a stylus, or other known devices or implements for performing a selection on a touch screen. The touch is provided with various touch inputs according to at least one of a touched area, a movement of the touch, a moving distance, a moving direction, or a holding time. As used herein, the term "palm touch" means a touch generated when a touched area is equal to or greater than a preset area threshold. For example, the palm touch may indicate that a palm or a hand surface of the user of a mobile terminal contacts or approaches a touch screen. As used herein, the term "finger touch" means a touch generated when a touched area is less than a preset area threshold. For example, the finger touch may indicate that a finger of a mobile terminal user contacts or approaches a touch screen.

As used herein, the term "preset threshold" means a predetermined threshold for a controller to execute a corresponding function by determining whether a touch input is equal to or greater than the preset threshold. The preset threshold includes a touched area in association with a touch input, a holding range of a touch input located on a touch screen, a moving distance of a touch input, and a holding time of a touch input on a touch screen. Further, the preset threshold may be set by a certain numerical values such as millimeters, centimeters, milliseconds and seconds.

Figure 1:
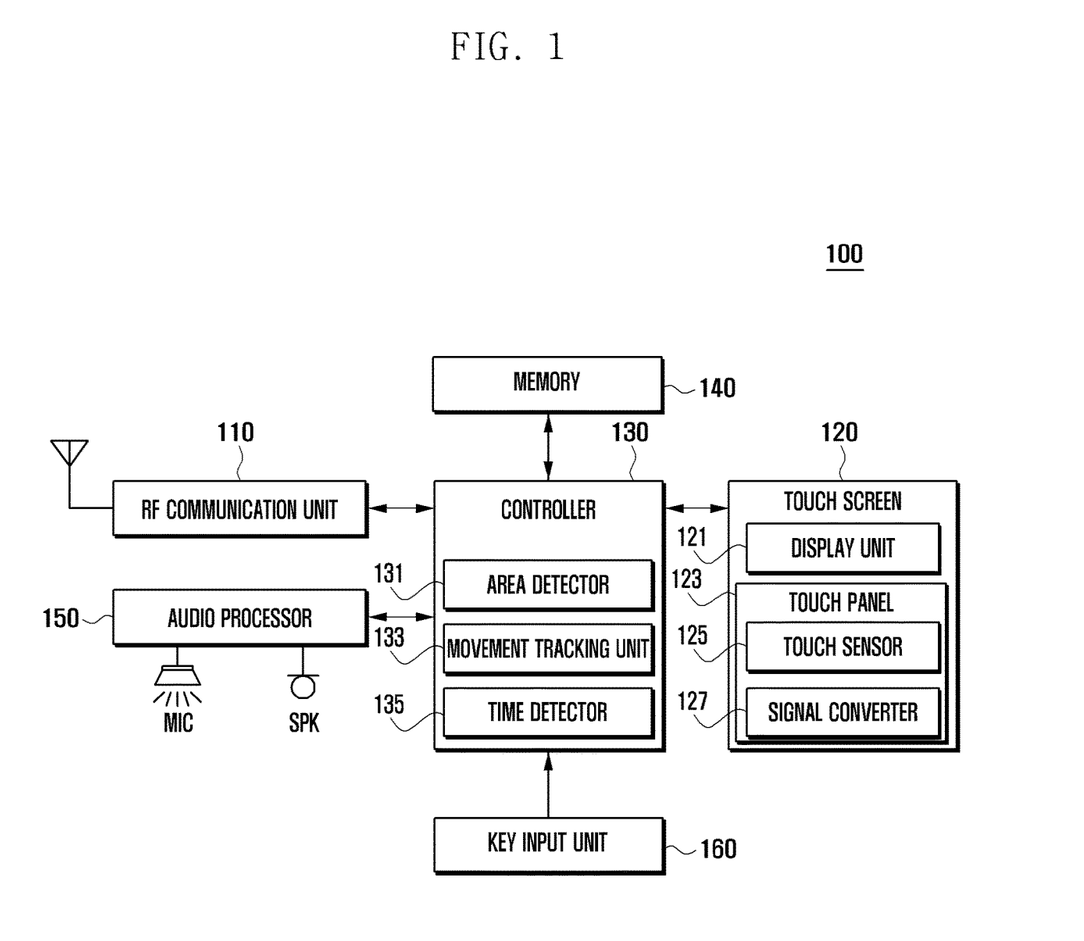
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention. It is assumed in this exemplary embodiment, for illustrative purposes only, that the mobile terminal is a mobile phone, but it is understood that the present invention may be used with any known types of electronic devices.

Referring to FIG. 1, a mobile terminal 100 includes a radio frequency (RF) communication unit 110, a touch screen 120, a controller 130, a memory 140, an audio processor 150, and a key input unit 160.

The RF communication unit 110 executes an RF communication function of the mobile terminal 100. The RF communication unit 110 may include an RF transmitter up-converting a frequency of a transmitted signal and amplifying the signal, and an RF receiver low-noise-amplifying a received to signal and down-converting the signal.

The touch screen 120 includes a display unit 121 and a touch panel 123. The display unit 121 displays a state of the mobile terminal 100. In this case, the display unit 121 is implemented, for example, by a liquid crystal display (LCD). The display unit 121 includes an LCD controller, a memory for storing display data, and an LCD display element. The touch panel 123 is mounted on or incorporated in the display unit 121, and senses a touch input occurring on the display unit 121. The touch panel 123 is composed of a touch sensor 125 and a signal converter 127. The touch sensor 125 detects a change in a physical characteristic, for example, resistance or capacitance of the touch panel 123 to sense the touch input. The signal converter 127 converts the change in the physical characteristic into a touch signal.

The controller 130 executes a function for controlling an overall operation of the mobile terminal 100. The controller 130 includes a data processor composed of a transmitter encoding and modulating a transmitted signal and a receiver demodulating and decoding a received signal. The data processor may be composed of a modem and a codec. The codec includes a data codec for processing packet data and an audio codec for processing an audio signal such as a voice. Further, the controller 130 provides user interfaces corresponding to various touch inputs according to the exemplary embodiment of the present invention described herein. That is, the controller 130 executes various functions by touch inputs. In this case, the controller 130 recognizes a touch input, according to at least one of a touched area, a movement of the touch, a moving distance, a moving direction, or a holding time of a touch, to execute a corresponding function. To do this, the controller 130 includes an area detector 131, a movement tracking unit 133, and a time detector 135. The area detector 131 detects a touched location and a touched area corresponding to a touch. The movement tracking unit 133 determines whether a touch moves. Further, the movement tracking unit 133 tracks a moving direction corresponding to the touch and detects a moving distance. The time detector 135 detects a holding time of a touch within a preset holding range from a touched location corresponding to the touch.

The memory 140 may be configured by a program memory and a data memory. The program memory stores programs for controlling a typical operation of the mobile terminal 100. The program memory may further store programs for providing user interfaces corresponding to various touch inputs according to the exemplary embodiment of the present invention described herein. The data memory executes a function for storing data created while programs are being executed. In this case, the memory 140 stores data in connection with respective functions corresponding to respective touch inputs according to the exemplary embodiment of the present invention. The memory 140 stores thresholds to be compared with a touched area, a presence of movement, a moving distance, a moving direction, or a holding time of a touch respectively.

The audio processor 150 plays a reception audio signal output from the audio codec of the data processor through a speaker SPK, or transmits a transmission audio signal created by a microphone MIC and sent to the audio codec of the data processor.

The key input unit 160 includes functions keys for setting and executing various functions.

Figure 2:
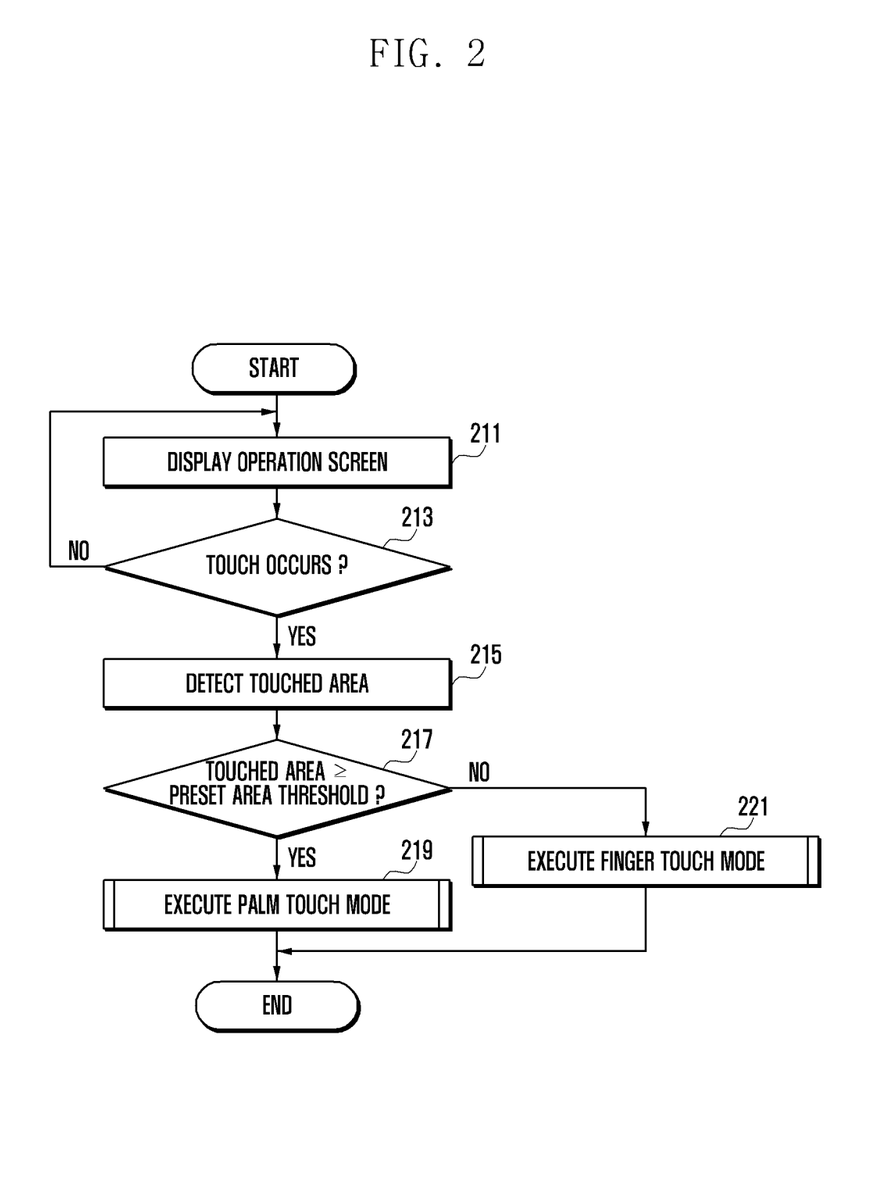
FIG. 2 is a flowchart illustrating a method for providing user interfaces of a mobile terminal according to the exemplary embodiment of the present invention.

FIG. 2 is a flowchart illustrating a method for providing a user interface of a mobile terminal according to the exemplary embodiment of the present invention.

Referring to FIG. 2, in the method for providing the user interface of the present invention, a controller 130 firstly displays an operation screen in step 211. That is, the controller 130 activates the touch screen 120 to display the operation screen through the touch screen 120. In this case, the controller 130 displays the operation screen corresponding to a currently executed menu or application.

Next, if a touch does not occur on the touch screen in step 213, the method loops back to step 211 to continue displaying the operation screen and detecting for a touch. However, if a touch occurs on the touch screen 120 in step 213, the controller 130 senses the occurred touch, and detects a touched area corresponding to the touch in step 215. In this case, the controller 130 further detects a touched location. For example, the controller 130 may detect the size of a region on which a touch is sensed on the touch screen 120 as the touched area, and detect one of a plurality of coordinates of a corresponding region as the touched location. The controller 130 compares the touched area with a preset area threshold in step 217. In this case, the preset area threshold may be a single value or values pertaining to a predetermined range. In this case, the controller 130 may compare the total size of the touched area or the length corresponding to a certain direction in the touched area with the preset area threshold. That is, the controller 130 determines whether the touched area is equal to or greater than the preset area threshold.

If it is determined at step 217 that the touched area is equal to or greater than the area threshold, the controller 130 recognizes the touch as a palm touch and executes a palm touch mode for executing a function corresponding to the palm touch in step 219. In this case, if the touched area is equal to or greater than an upper limit of the values corresponding to the area threshold, the controller 130 may execute the palm touch mode. In this case, the controller 130 further classifies a touch input, according to at least one of a touched area corresponding to a touch, a movement of the touch, a moving distance, a moving direction, or a holding time of the palm touch, to execute a corresponding function. A procedure of performing a palm touch by the controller 130 will be described in detail below. However, as described in greater detail herein, if it is determined at step 217 that the touched area is less than the preset area threshold, the controller 130 recognizes the touch as a finger touch and performs a finger touch mode for executing a function corresponding to the finger touch in step 221.

Figure 3:
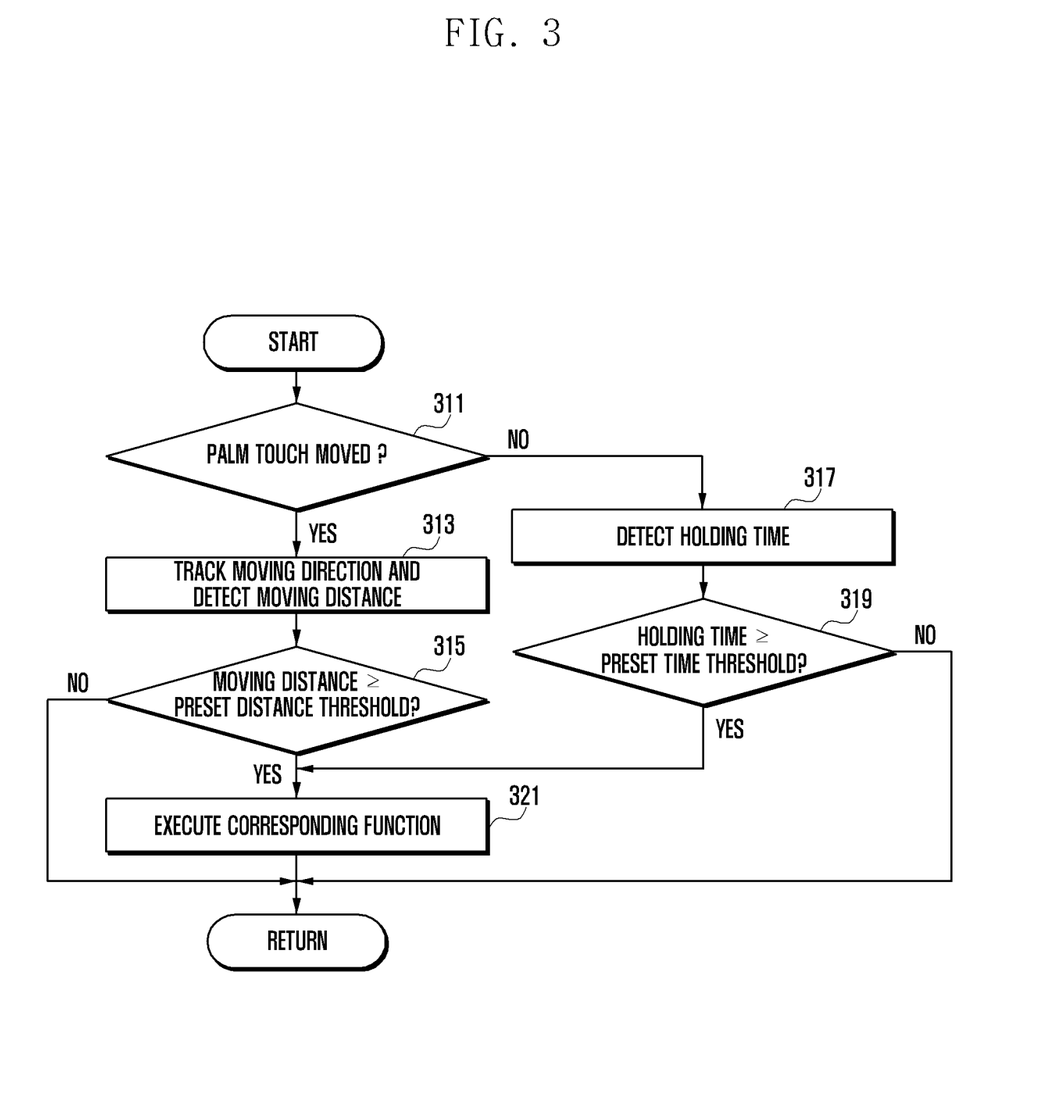
FIG. 3 is a flowchart illustrating a procedure for performing a palm touch mode shown in FIG. 2.

FIG. 3 is a flowchart illustrating a procedure for performing a palm touch mode shown in FIG. 2. FIG. 4 to FIG. 7 are views illustrating examples of the procedure for performing a palm touch mode shown in FIGS. 2-3.

Referring to FIG. 3, a controller 130 determines in step 311 whether a palm touch moves. In this case, the controller 130 may determine whether a palm touch is moved by determining whether the palm touch deviates from a region on the touch screen 120 located within a preset holding range from the touched location.

If it is determined at step 311 that the palm touch moves, the controller 130 tracks a moving direction of the palm touch and detects a moving distance thereof in step 313. In this case, the movement of a palm touch may include any of a drag, sweep, and twist of the palm touch. Subsequently, the controller 130 compares the moving distance with a preset distance threshold in step 315. Here, the preset distance threshold may be a single value or a plurality of values classified at predetermined intervals. Further, the preset distance threshold may be set corresponding to a certain direction. In this case, the controller 130 may compare the moving distance with the preset distance threshold or the distance threshold in connection with the moving direction. That is, the controller 130 determines whether the moving distance is equal to or greater than the preset distance threshold.

If it is determined at step 315 that the moving distance is equal to or greater than the preset distance threshold, the controller 130 determines a touch input of the palm touch to execute a corresponding function in step 321 and then returns to complete step 219 in FIG. 2 and then end the procedure. In addition, if the moving distance is equal to or greater than a lower limit among values corresponding to the preset distance threshold, the controller 130 compares the moving distance with respective values corresponding to the preset distance threshold. Further, the controller 130 detects a value corresponding to the moving distance to determine a touch input of the palm touch, and execute a corresponding function in step 321. In this case, the controller 130 may determine a touch input according to release of the palm touch on the touch screen 120 to execute a corresponding function. Next, the controller 130 returns to complete step 219 in FIG. 2 and end the procedure. However, if it is determined in step 315 that the moving distance is less than the preset distance threshold, the controller 130 returns to complete step 219 in FIG. 2 and end the procedure.

Referring back to step 311 in FIG. 3, if it is determined in step 311 that the palm touch does not move, the procedure performs steps 317-319, as described in greater detail herein.

Figure 4:
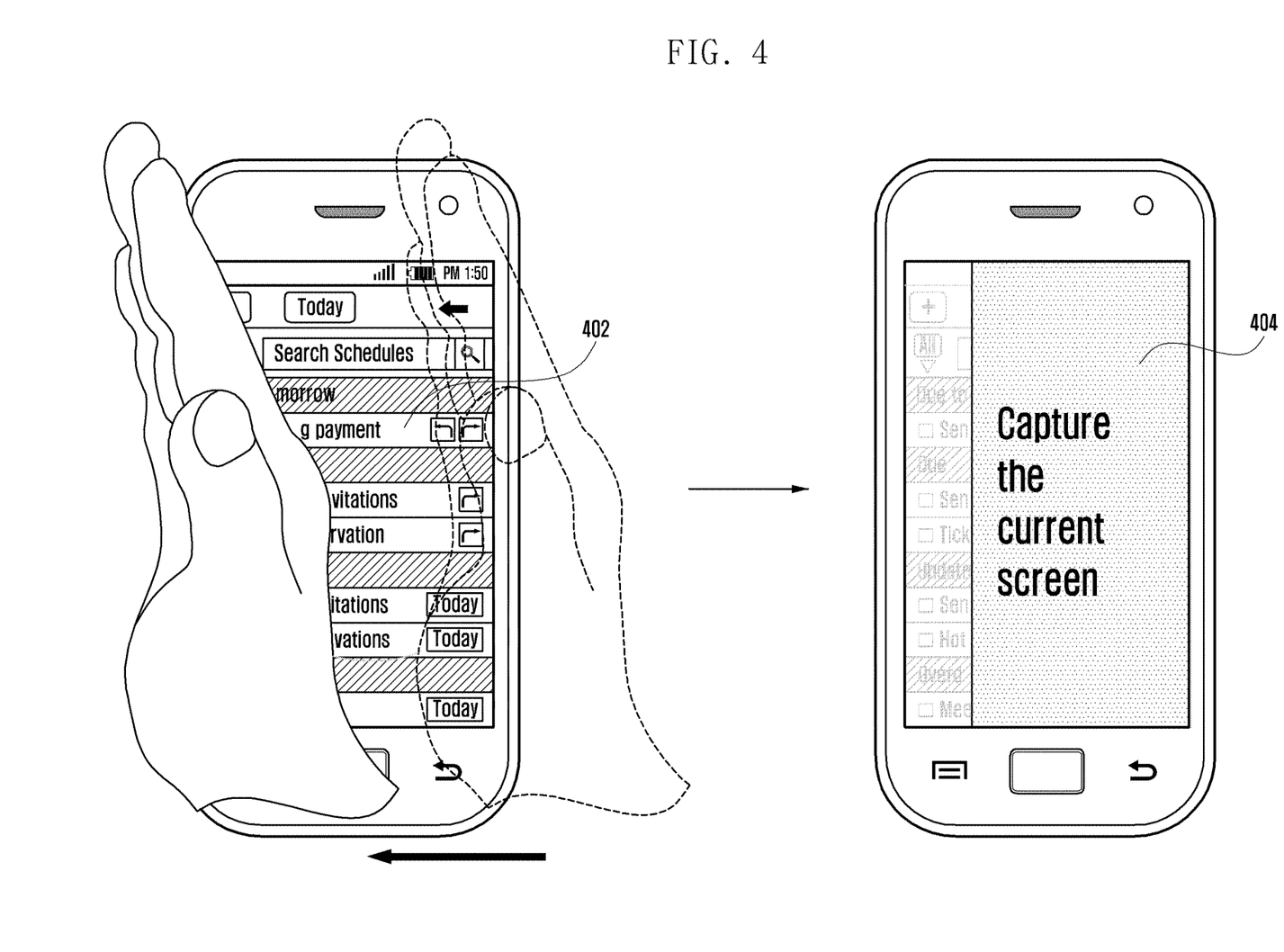
FIG. 4, FIG. 5, FIG. 6 and FIG. 7 are views illustrating examples of a procedure for performing a palm touch mode shown in FIG. 2.

For example, as shown in FIG. 4, when a hand surface of the user of a mobile terminal 100 moves from a left side of the touch screen 120 to a right side thereof while an operation screen 402 is being displayed, the controller 130 may sense a movement of the palm touch. At this time, the controller 130 may track a moving direction of the palm touch movement, as shown in the leftward arrow in FIG. 4, and detects a moving distance thereof. If the moving distance of the palm touch is equal to or greater than the preset distance threshold, the controller 130 may capture the operation screen 402 with an image as shown in the screen 404 in FIG. 4, using known image or screen capture methods.

Figure 5:
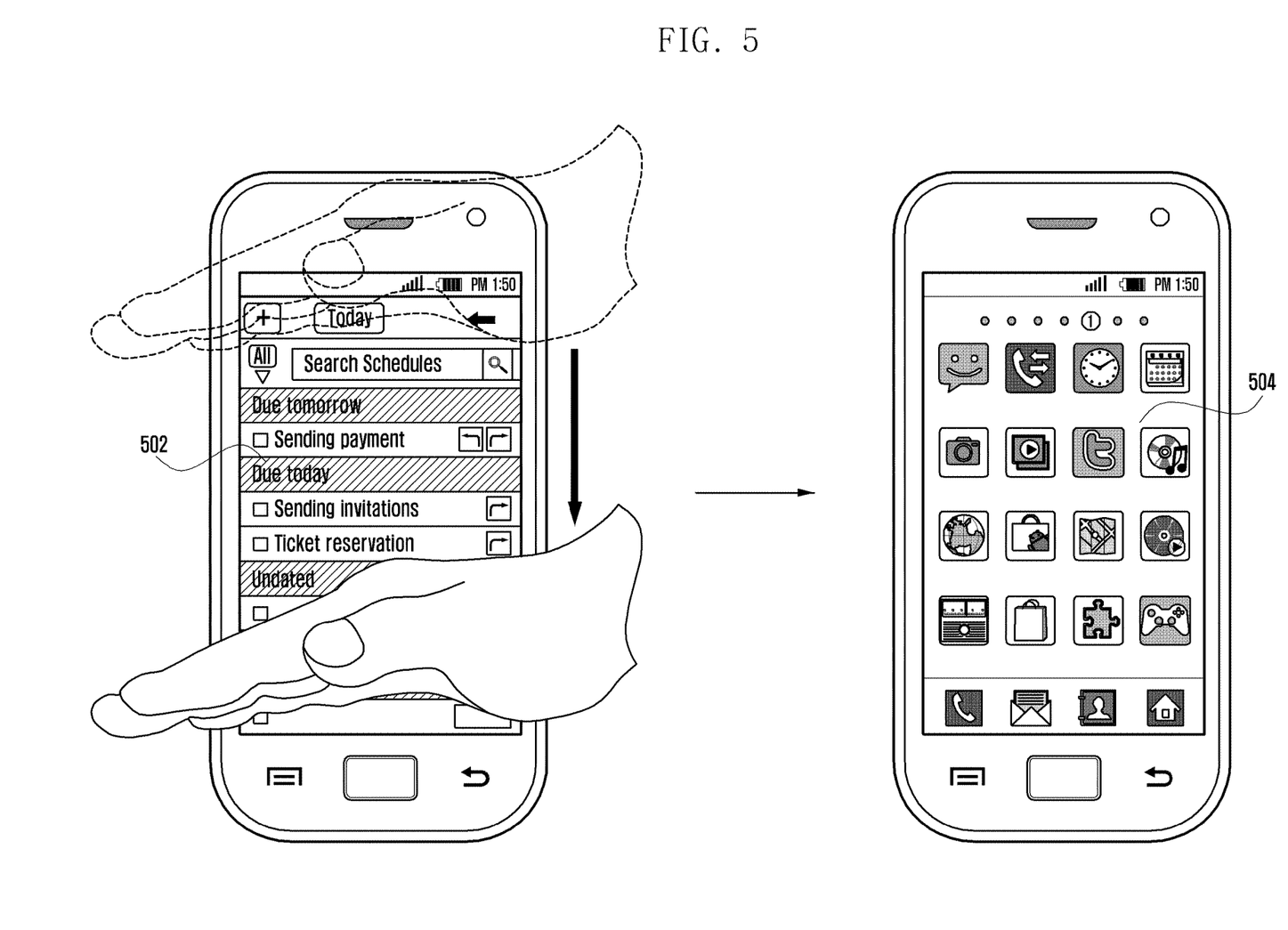

In addition, as shown in FIG. 5, if the hand surface of the user of the mobile terminal 100 moves from an upper part of the touch screen 120 to a lower part thereof while the operation screen 502 is being displayed, the controller 130 may sense movement of the palm touch. In this case, the controller 130 may track a moving direction of the palm touch, as shown in the downward arrow in FIG. 5, and detect a moving distance thereof. If the moving distance of the palm touch is equal to or greater than a preset distance threshold, the controller 130 may change the screen of the touch screen 120 from the operation screen 502 to another screen 504 as shown in FIG. 5 and display the other screen 504. In this case, the other screen 504 may be, for example, previously set by the controller 130, and for example, may be a home screen. Here, the controller 130 may terminate a currently executed menu or application shown in the screen 502 in FIG. 5. Alternatively, the controller 130 may not terminate the currently executed menu or application but may instead display the home screen 504 while the currently executed menu or application continues to function as a background operation.

Figure 6:
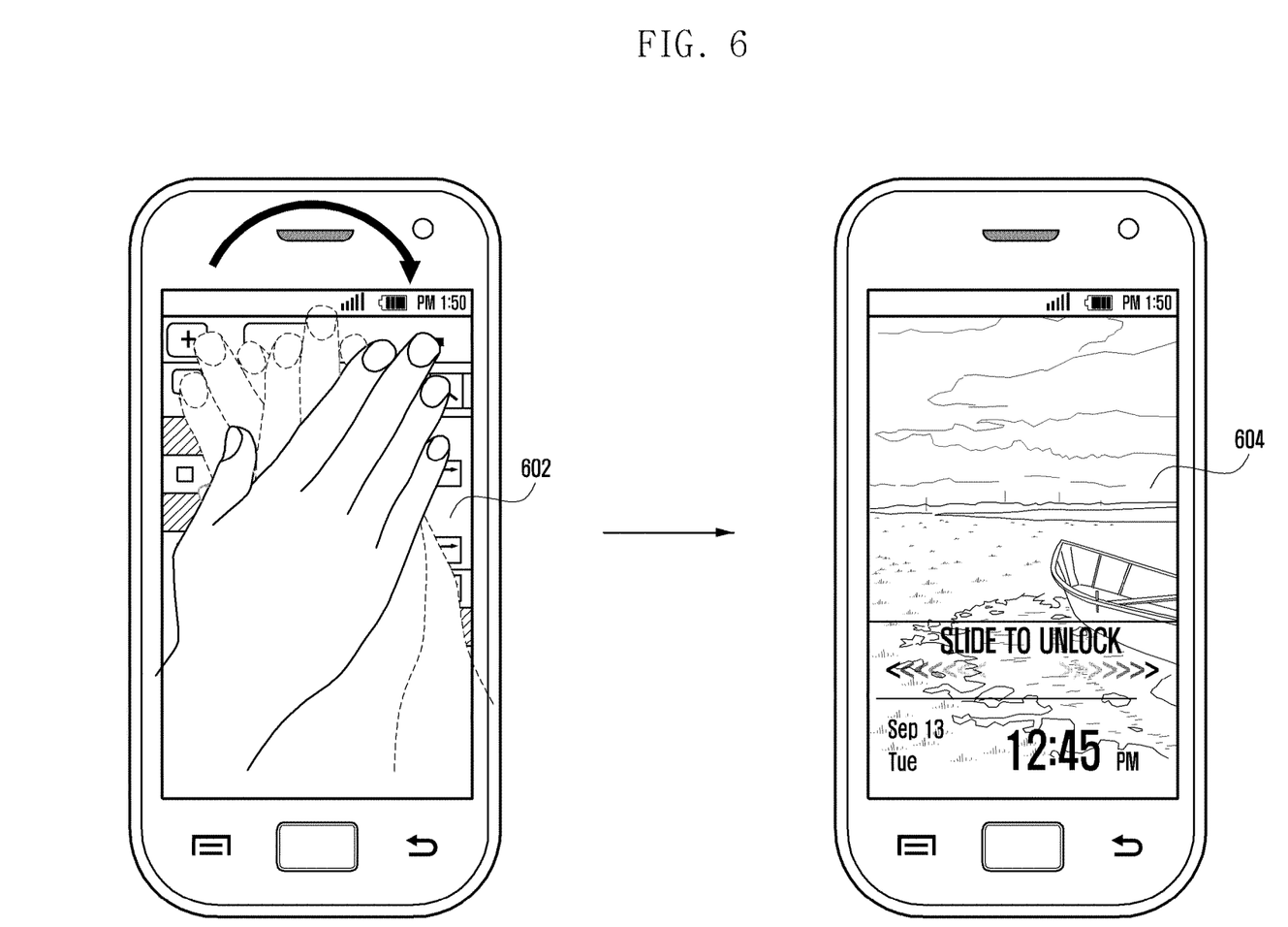

As shown in FIG. 6, when a palm of the user of the mobile terminal 100 is twisted on the touch screen 120 while the operation screen 602 is being displayed, the controller 130 may sense movement of the palm touch. In this case, the controller 130 may sense a change in a touched location of the palm touch to sense movement of the palm touch. In this case, the controller 130 may sense a change in coordinates arranged at a boundary of a region corresponding to the palm touch to sense movement of the palm touch. The controller 130 may sense the direction change in a long axis of axes connecting coordinates arranged at a boundary of a region corresponding to the palm touch to sense movement of the palm touch; for example, to detect the movement of the palm touch as shown in the curved clockwise arrow in FIG. 6. Moreover, the controller 130 may track a moving direction of the palm touch and detect a moving distance thereof. If the moving distance of the palm touch is equal to or greater than a preset distance threshold, the controller 130 may set or lock in the touch screen 120 to display a locked screen 604 as shown in FIG. 6. In this case, the controller 130 may control the audio processor 150 to output an audio signal indicating a lock of the touch screen 120.

However, referring back to FIG. 3, if it is determined at step 311 that the palm touch does not move, the controller 130 detects a holding time of the palm touch in step 317. That is, if the palm touch does not deviate from a region in a holding range, the controller 130 may determine that the palm touch remains or stays in a specific position without a movement. Further, the controller 130 compares the holding time with a preset time threshold in step 319. In this case, the preset time threshold may be a single value or a plurality of values classified at predetermined intervals. That is, the controller 130 determines whether the holding time is equal to or greater than the preset time threshold.

If it is determined at step 319 that the holding time is equal to or greater than the preset time threshold, the controller 130 proceeds to step 321, as described herein, and determines a touch input of the palm touch and executes a corresponding function in step 321. If the holding time is equal to or greater than a lower limit among values corresponding to the preset time threshold, the controller 130 compares the holding time with a respective value corresponding to the preset time threshold. The controller 130 detects a value corresponding to the holding time to determine a touch input of the palm touch, and executes a corresponding function. In this case, the controller 130 may determine a touch input according to release of the palm touch in the touch screen 120 to execute a corresponding function. Next, the controller 130 returns to complete step 219 in FIG. 2 and end the procedure. However, in FIG. 3, if it is determined at step 319 that the holding time is less than the preset time threshold, the controller 130 returns to complete step 219 in FIG. 2 and end the procedure.

Figure 7:
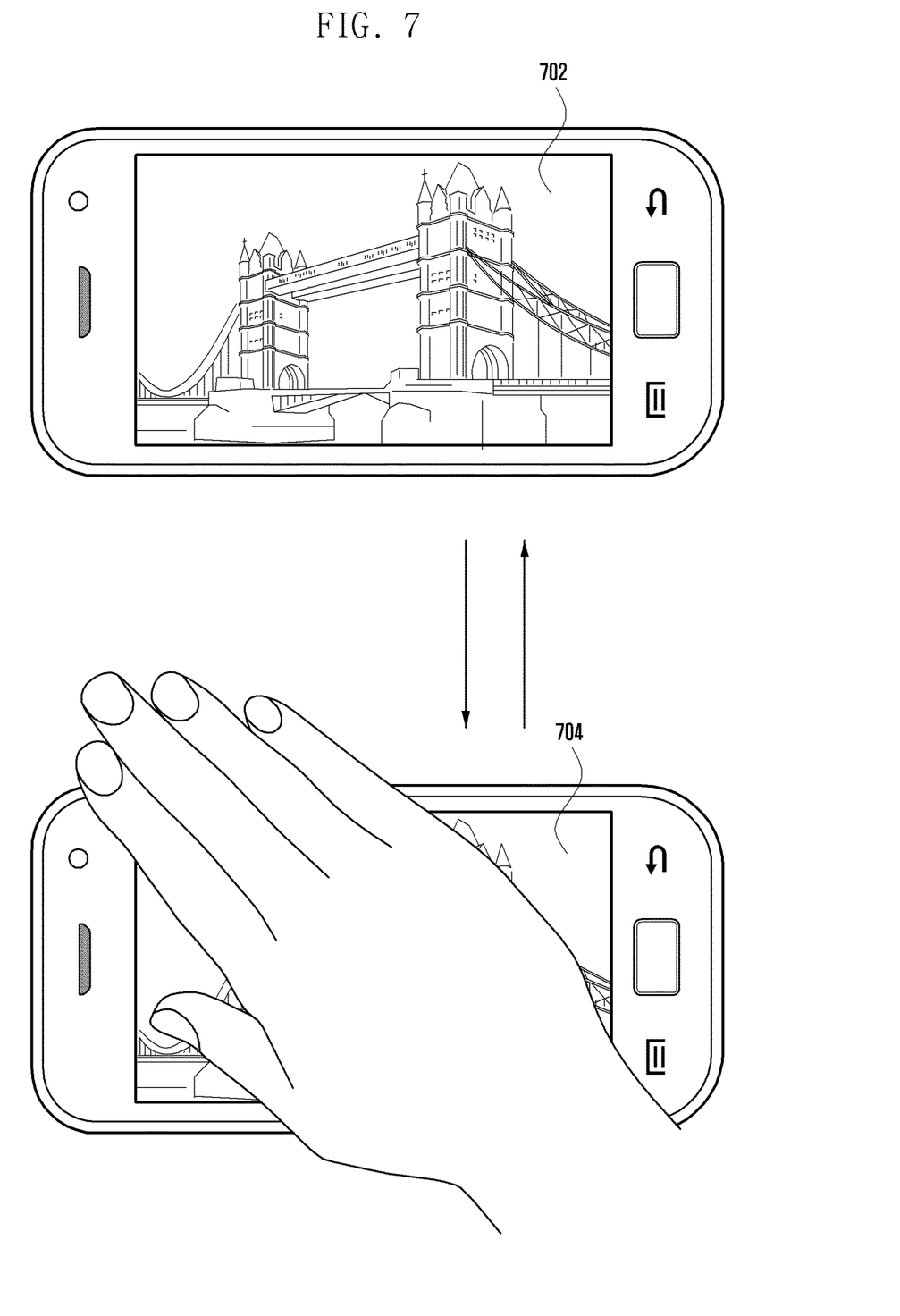

For example, the controller 130 may display an operation screen 702 as shown in FIG. 7. In this case, the controller 130 may perform an image call, that is, a communication involving images, which may including still images, moving images or pictures, and/or video, or digital broadcasting reception to play at least one of audios or videos. As shown in FIG. 7, when a palm of the user of the mobile terminal 100 contacts the touch screen 120 while the operation screen 702 is being displayed, the controller 130 may detect a holding time of the palm touch; that is, the palm of the user substantially maintains the position 704 of the palm or hand over the operation screen 702. In this case, the controller 130 may detect the holding time of the palm touch in step 317. If the holding time of the palm touch is equal to or greater than a preset time threshold, as detected in step 319, the controller 130 may stop playback of an audio or a video corresponding to the operation screen 702. Otherwise, in step 319, if the holding time is less than the preset time threshold, the method returns to complete step 219 in FIG. 2 and ends the procedure. Further, referring to FIG. 7, if contact of the palm of the user of the mobile terminal 100 is released from the touch screen 120, that is, removed from the position 704 over the operation screen 702, in a state that playback of the audio or the video stops as shown in FIG. 7, the controller 130 may play the image on the operation screen 702 or play the voice through the audio processor 150 of the mobile terminal 100, as shown in FIG. 7.

In the meantime, the controller 130 may display the operation screen 702 as illustrated in FIG. 7. At this time, the controller 130 may stop playback of at least one of the audio or the video. In this case, the operation screen 702 may be a still screen of an image. As illustrated in FIG. 7, if a palm of the user of the mobile terminal 100 contacts the touch screen 120, with the hand of the user in the position 704 in FIG. 7, while the operation screen 702 is being displayed, the controller 130 may sense holding of the palm touch; that is, maintaining the position 704 of the palm or hand over the operation screen 702. In this case, the controller 130 may detects a holding time of the palm touch. If the holding time of the palm touch is equal to or greater than the preset time threshold, as detected in step 319, the controller 130 may play an audio or a video corresponding to the operation screen 702, with playing the audio or the video being the corresponding function performed in step 321.

Referring back to FIG. 2, if it is determined at step 217 that the touched area is less than the preset area threshold, the controller 130 recognizes a touch as a finger touch and performs a finger touch mode for executing a function corresponding to the finger touch in step 221. At this time, if the touched area is less than a lower limit among values corresponding to the preset area threshold, the controller 130 may execute the finger touch mode. In this case, the controller 130 further classifies a touch input, according to at least one of a touched area corresponding to a touch, a movement of the touch, a moving distance, a moving direction, or a holding time of the finger touch, to execute a corresponding function. A procedure of performing a finger touch will be described in detail below.

Figure 8:
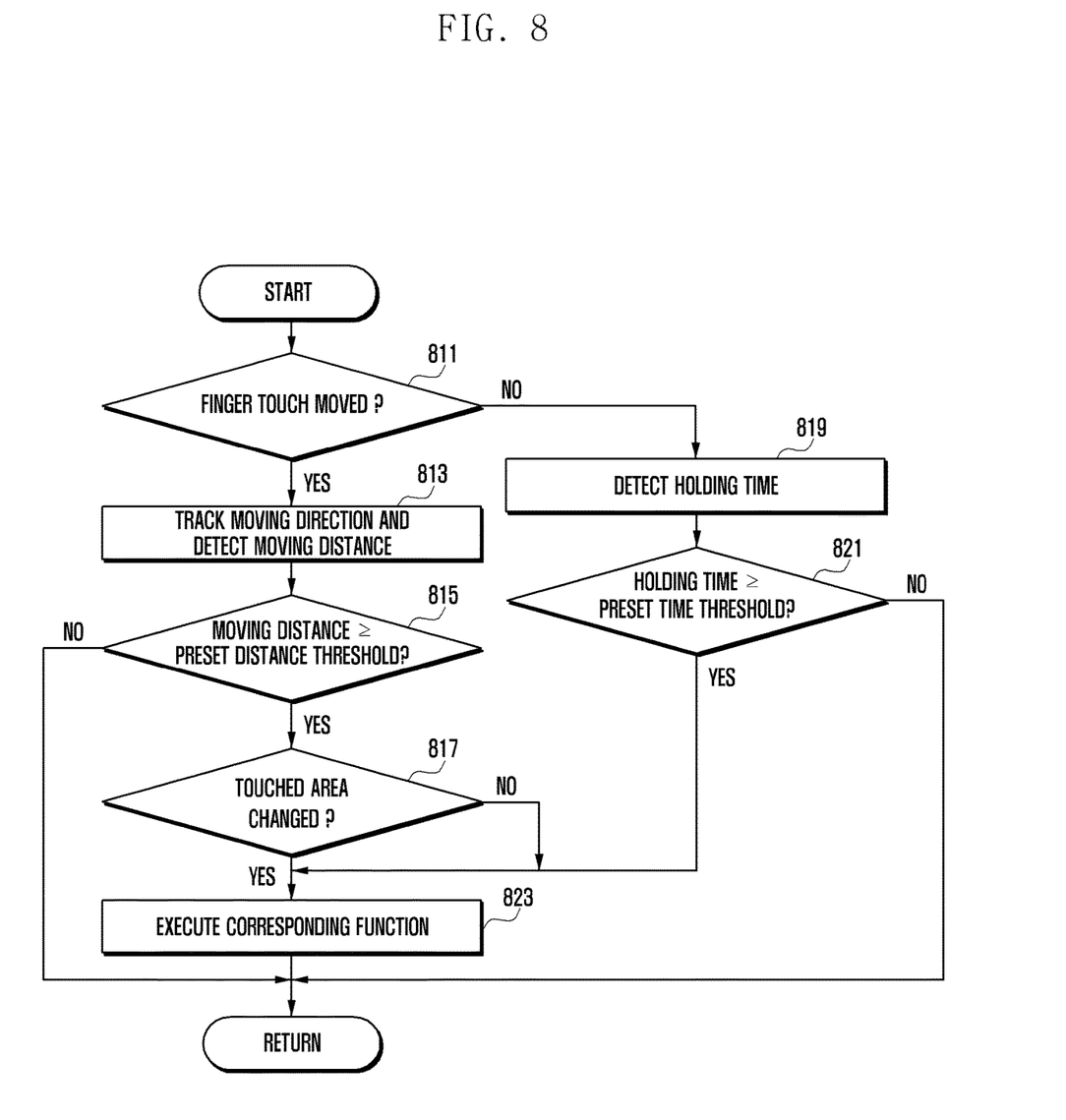
FIG. 8 is a flowchart illustrating a procedure for performing a finger touch mode shown in FIG. 2.

FIG. 8 is a flowchart illustrating a procedure for performing a finger touch mode shown in FIG. 2. FIG. 9 and FIGS. 10A-10D are views illustrating examples of a procedure for performing a finger touch mode shown in FIG. 2.

Referring to FIG. 8, a controller 130 determines whether a finger touch moves in step 811. In this case, the controller 130 may determine whether a palm touch moves by determining whether the finger touch deviates from a region located within a preset holding range from the touched location.

If it is determined at step 811 that the finger touch moves, the controller 130 tracks a moving direction of the finger touch and detects a moving distance thereof in step 813. In this case, the movement of a finger touch includes a drag, sweep, and twist of the palm touch. Subsequently, the controller 130 compares the moving distance with a preset distance threshold in step 815. Here, the preset distance threshold may be a single value, or a plurality of values classified at predetermined intervals. Further, the preset distance threshold may be set corresponding to a certain direction. In this case, the controller 130 may compare the moving distance with the preset distance threshold or the preset distance threshold in connection with the moving direction. That is, the controller 130 determines whether the moving distance is equal to or greater than the preset distance threshold in step 815.

If it is determined at step 815 that the moving distance is equal to or greater than the preset distance threshold, the controller 130 determines whether a touched area of the finger touch is changed in step 817. Further, the controller 130 determines a touch input according to whether the touched area of the finger touch is changed to execute a corresponding function in step 823. If the moving distance is equal to or greater than a lower limit among values corresponding to the preset distance threshold, the controller 130 compares the moving distance with respective values corresponding to the preset distance threshold. Further, the controller 130 detects a value corresponding to the moving distance to determine a touch input of the finger touch, and execute a corresponding function in step 823. In this case, the controller 130 may determine a touch input according to a release of the finger touch on the touch screen 120 to execute the corresponding function in step 823. Next, after step 823 the controller 130 returns to complete step 221 in FIG. 2 and ends the procedure. Referring back to step 815, if it is determined in step 815 that the moving distance is less than the preset distance threshold, the controller 130 returns to complete step 221 in FIG. 2 and ends the procedure.

Referring back to step 817, if a touched area is not changed, the procedure executes a corresponding function in step 823, with the corresponding function for the unchanged touched area being different than the corresponding function of the changed touched area.

Figure 9:
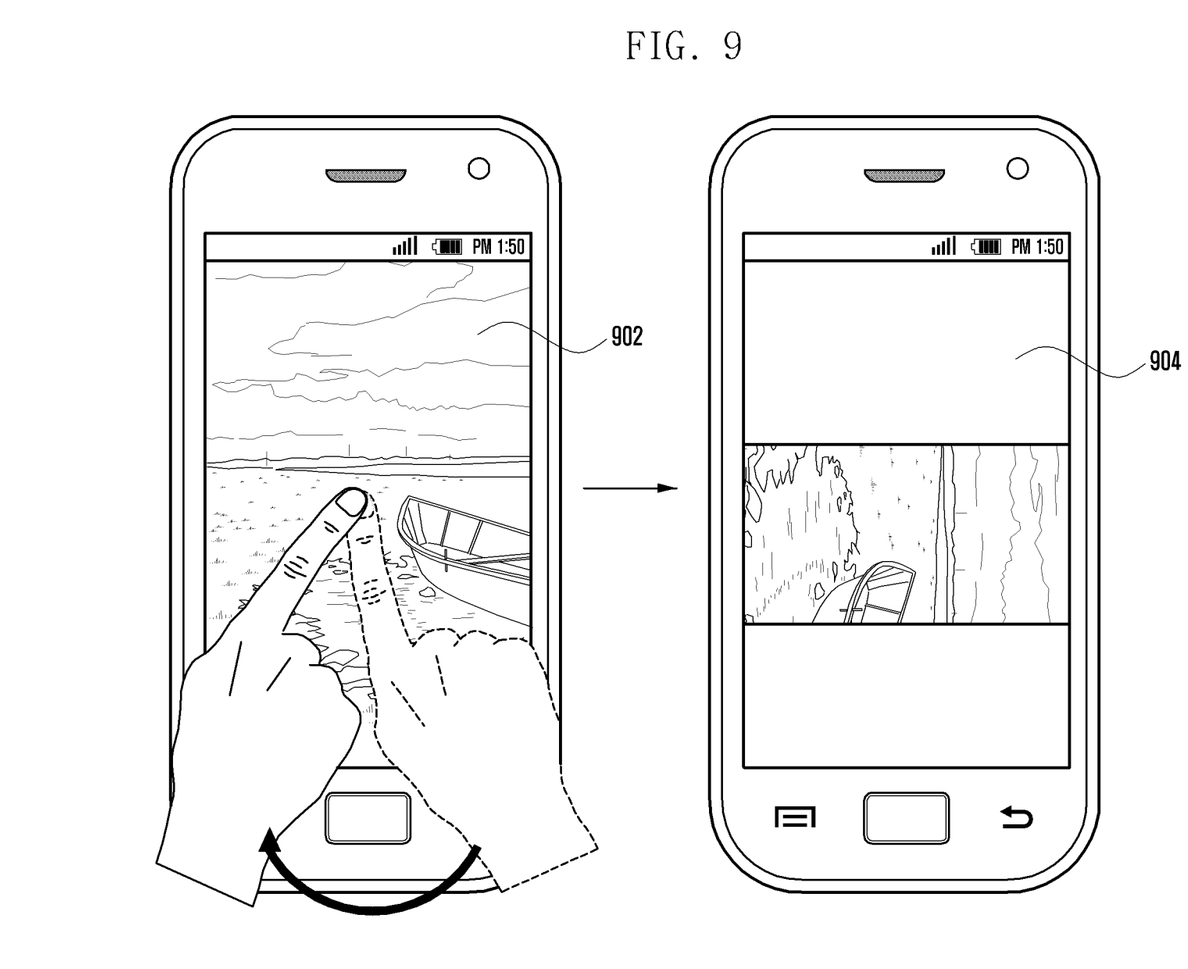
FIG. 9, FIG. 10A, FIG. 10B, FIG. 10C and FIG. 10D are views illustrating examples of a procedure for performing a finger touch mode shown in FIG. 2.

As shown in FIG. 9, if a finger of the user of the mobile terminal 100 is twisted on the touch screen 120 while the operation screen 902 is being displayed, the controller 130 may sense a movement of the finger touch. In this case, the controller 130 may sense a change in a touched location of the finger touch to sense movement of the finger touch. In this case, the controller 130 may sense a change in coordinates arranged at a boundary of a region corresponding to the finger touch to sense the movement of the finger touch. The controller 130 may sense a direction change in a long axis of axes connecting coordinates arranged at a boundary of a region corresponding to the finger touch to sense a movement of the palm touch. Moreover, the controller 130 may track a moving direction of the palm touch and detect a moving distance thereof. If the moving distance of the finger touch is equal to or greater than the preset distance threshold, the controller 130 may rotate the operation screen 902 to appear as a rotated screen 904 as shown in FIG. 9.

Figure 10A:
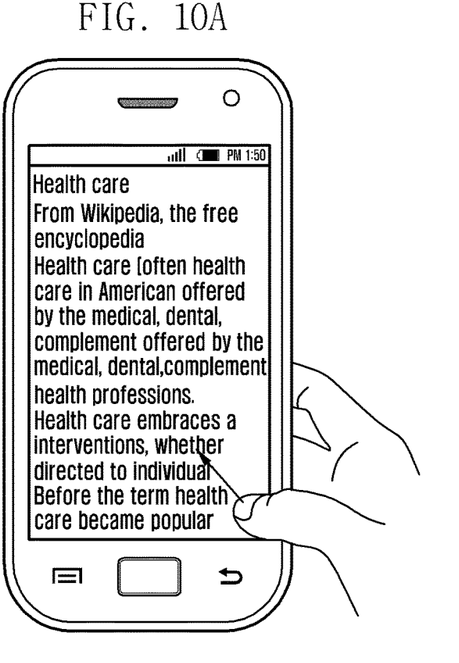
Figure 10B:
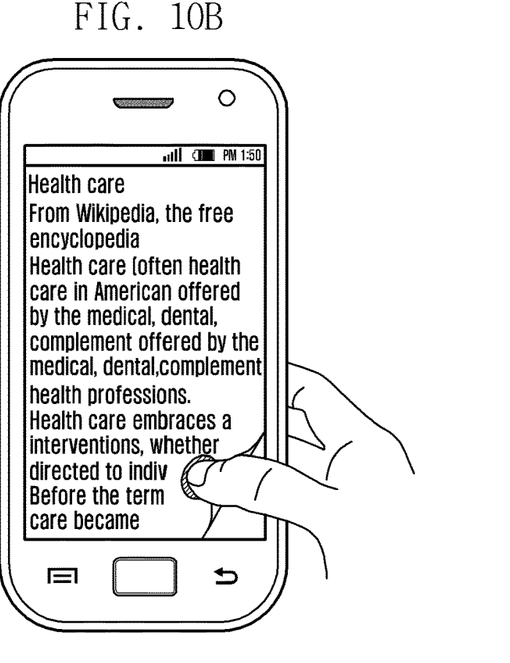
Figure 10C:
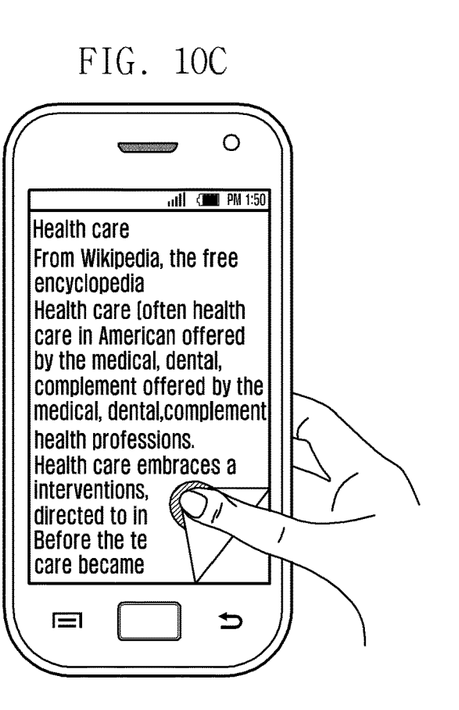
Figure 10D:
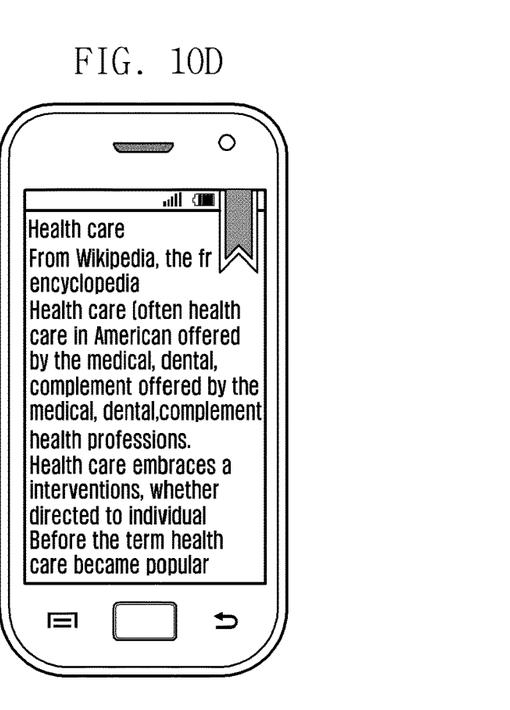

As illustrated in FIG. 10A, if a finger of the user of the mobile terminal 100 moves from an edge of a corner of the touch screen 120 to an inner location of the touch screen 120 while an operation screen is being displayed, the controller 130 may sense a movement of a finger touch. In this case, the controller 130 may track a moving direction of the finger touch and detects a moving distance thereof. If the moving distance of the finger touch is equal to or greater than the preset distance threshold, as detected in step 815 in FIG. 8, the controller 130 may simulate a paper folding effect by changing the appearance of a corner of the touch screen 120 corresponding to the changed operation screen as shown in FIG. 10B. Next, as illustrated in FIG. 10C, if a finger of the user of the mobile terminal 100 remains in a specific location on the touch screen 120, the controller 130 may determine whether a touched area corresponding to the finger touch is changed in step 817 of FIG. 8. If it is determined that the touched area is changed, the controller 130 may add a bookmark on the operation screen as illustrated in FIG. 10D; for example, a simulated ribbon in the upper right corner of the touch screen 120. In addition, to save the bookmarked screen, the controller 130 may add a location of the operation screen to a favorites list to record the location in the memory 140.

However, referring back to FIG. 8, if it is determined at step 811 that the finger touch does not move, the controller 130 detects a holding time of the palm touch in step 819. That is, if the finger touch is not separated from a region in a holding range, the controller 130 may determine that the finger touch remains in its location without the movement. Further, the controller 130 compares the holding time with a preset time threshold in step 821. In this case, the time threshold may be a single value or a plurality of values classified at predetermined intervals. That is, the controller 130 determines whether the holding time is equal to or greater than the preset time threshold in step 821.

If it is determined at step 821 that the holding time is equal to or greater than the preset time threshold, the controller 130 determines a touch operation of the finger touch and executes a corresponding function in step 823. If the holding time is equal to or greater than a lower limit among numerical time values corresponding to the preset time threshold, the controller 130 compares the holding time with respective values corresponding to the preset time threshold. The controller 130 detects a numerical time value corresponding to the holding time to determine a touch operation of the finger touch, and executes a corresponding function in step 823. In this case, the controller 130 may determine a touch operation according to a release of the finger touch in the touch screen 120 to execute the corresponding function. Next, the controller 130 returns to complete step 221 in FIG. 2 and end the procedure. However, if it is determined at step 821 that the holding time is less than the preset time threshold, the controller 130 returns to complete step 221 in FIG. 2 and end the procedure.

Meanwhile, the foregoing embodiments have described that a touch is divided into a palm touch and a finger touch in the mobile terminal 100 according to a touched area. However, the present invention is not limited thereto. That is, as a plurality of area thresholds are set in the mobile terminal 100, the mobile terminal 100 may classify a touched area using the area thresholds according to various reference ranges. Further, the mobile terminal 100 may combine a touched area with at least one of a movement of the touch, a moving distance, a moving direction, or a holding time of a touch to determine a touch input, and perform a corresponding function.

In the present invention, various touch inputs are capable of being sensed through a touch screen in a mobile terminal, and user interfaces corresponding to respective touch inputs are provided. That is, the mobile terminal 100 determines a touch input based on at least one of a touched area, a movement of the touch, a moving distance, a moving direction, or a holding time of a touch sensed through a touch screen 120. In addition, the present invention provides a user interface for executing functions corresponding to respective touch inputs. This improves the convenience in using the mobile terminal 100.

The above-described apparatus and methods according to the present invention can be implemented in hardware, firmware or as software or computer code that can be stored in a recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A mobile terminal comprising:
   a touch screen for receiving a touch input;
   a speaker; and
   a controller configured to:
   control the touch screen to display a screen and the speaker to output sound while an application is in an active state;
   detect the touch input via the touch screen while the screen is displayed;
   determine whether the touch input corresponds to a palm touch input;
   in response to determining that the palm touch input is maintained for at least a preset time threshold, stop output of the sound through the speaker while the application maintains the active state.

2. The mobile terminal of claim 1, wherein the controller is configured to:
   during the touch input, detect a touched area of the touch screen defined by at least one of a plurality of coordinates corresponding to the touch input; and
   determine whether the touch input corresponds to the palm based on the detected touched area defined by the at least one of the plurality of coordinates.

3. A method for providing a user interface in a mobile terminal having a touch screen, the method comprising:
   controlling the touch screen to display a screen and a speaker to output sound while an application is in an active state;
   detecting a touch input via the touch screen while the screen is displayed;
   determining whether the touch input corresponds to a palm touch input;
   in response to determining that the palm touch input is maintained for at least a preset time threshold, stop output of the sound through the speaker while the application maintains the active state.

4. The method of claim 3, further comprising:
   during the touch input, detecting a touched area of the touch screen defined by at least one of a plurality of coordinates corresponding to the touch input; and
   determining whether the touch input corresponds to the palm based on the detected touched area defined by the at least one of the plurality of coordinates.

5. A non-transitory computer-readable medium storing instructions that, when executed by one or more processors, cause the one or more processors to perform operations comprising:
   controlling a touch screen to display a screen and a speaker to output sound while an application is in an active state;
   detecting a touch input on the touch screen having a touched area while the screen is displayed;
   determining whether the touch input corresponds to a palm touch input;
   in response to determining that the palm touch input is maintained for at least a preset time threshold, stop output of the sound through the speaker while the application maintains the active state.

6. The non-transitory computer-readable medium of claim 5, wherein the operations further comprise:
   during the touch input, detecting the touched area of the touch screen defined by at least one of a plurality of coordinates corresponding to the touch input; and
   determining whether the touch input corresponds to the palm based on the detected touched area defined by the at least one of the plurality of coordinates.

* * * * *